US011138966B2

(12) United States Patent
Chen et al.

(10) Patent No.: US 11,138,966 B2
(45) Date of Patent: Oct. 5, 2021

(54) UNSUPERVISED AUTOMATIC SPEECH RECOGNITION

(71) Applicant: TENCENT AMERICA LLC, Palo Alto, CA (US)

(72) Inventors: Jianshu Chen, Woodinville, WA (US); Chengzhu Yu, Bellevue, WA (US); Dong Yu, Bothell, WA (US); Chih-Kuan Yeh, Pittsburgh, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 160 days.

(21) Appl. No.: 16/269,951

(22) Filed: Feb. 7, 2019

(65) Prior Publication Data

US 2020/0258497 A1    Aug. 13, 2020

(51) Int. Cl.
*G10L 15/00* (2013.01)
*G10L 15/06* (2013.01)
*G10L 15/02* (2006.01)
*G10L 15/22* (2006.01)
*G10L 15/16* (2006.01)
*G10L 15/30* (2013.01)
*G06N 3/04* (2006.01)
*G06N 3/08* (2006.01)
(Continued)

(52) U.S. Cl.
CPC .......... *G10L 15/063* (2013.01); *G06F 40/20* (2020.01); *G06N 3/0445* (2013.01); *G06N 3/088* (2013.01); *G10L 15/02* (2013.01); *G10L 15/16* (2013.01); *G10L 15/22* (2013.01); *G10L 15/30* (2013.01); *G10L 15/187* (2013.01); *G10L 2015/025* (2013.01)

(58) Field of Classification Search
None
See application file for complete search history.

(56) References Cited

U.S. PATENT DOCUMENTS

| 5,956,676 | A  |    | 9/1999  | Shinoda |
| 6,076,056 | A  |    | 6/2000  | Huang et al. |
| 9,786,270 | B2 | *  | 10/2017 | Senior .................. G10L 15/063 |

(Continued)

OTHER PUBLICATIONS

Yu-Hsuan Wang, Cheng-Tao Chung, and Hung-yi Lee. 2017b. Gate Activation Signal Analysis for Gated Recurrent Neural Networks and Its Correlation with Phoneme Boundaries. In Interspeech 2017.*

(Continued)

*Primary Examiner* — Richard Z Zhu
(74) *Attorney, Agent, or Firm* — Sughrue Mion, PLLC

(57) ABSTRACT

A method for generating an automatic speech recognition (ASR) model using unsupervised learning includes obtaining, by a device, text information. The method includes determining, by the device, a set of phoneme sequences associated with the text information. The method includes obtaining, by the device, speech waveform data. The method includes determining, by the device, a set of phoneme boundaries associated with the speech waveform data. The method includes generating, by the device, the ASR model using an output distribution matching (ODM) technique based on determining the set of phoneme sequences associated with the text information and based on determining the set of phoneme boundaries associated with the speech waveform data.

14 Claims, 5 Drawing Sheets

(51) Int. Cl.
   *G06F 40/20* (2020.01)
   *G10L 15/187* (2013.01)

(56) References Cited

U.S. PATENT DOCUMENTS

| | | | |
|---|---|---|---|
| 10,210,860 B1* | 2/2019 | Ward | G10L 15/30 |
| 10,332,508 B1* | 6/2019 | Hoffmeister | G06N 3/084 |
| 10,671,889 B2* | 6/2020 | Poole | G06K 9/6257 |
| 2002/0152207 A1 | 10/2002 | Lyudovyk et al. | |
| 2007/0083369 A1* | 4/2007 | McCuller | G10L 15/187 |
| | | | 704/254 |
| 2012/0116766 A1* | 5/2012 | Wasserblat | G10L 15/08 |
| | | | 704/254 |
| 2017/0263240 A1 | 9/2017 | Kalinli-Akbacak | |
| 2018/0082677 A1 | 3/2018 | Yaghi et al. | |
| 2018/0247636 A1 | 8/2018 | Arik et al. | |

OTHER PUBLICATIONS

Ilya Sutskever, Ratal Jozefowicz, Karol Gregor, et al. Towards principled unsupervised learning. arXiv preprint arXiv:1511.06440, 2015.*

Y Liu, J Chen, L Deng, "Unsupervised sequence classification using sequential output statistics", Advances in Neural Information Processing Systems, 2017.*

C.-K. Yeh, J. Chen, C. Yu, and D. Yu, "Unsupervised speech recognition via segmental empirical output distribution matching," in International Conference on Learning Representations, 2019. [Online], Available: https://openreview.net/forum?id=Bylmkh05KX.*

International Search Report dated Apr. 24, 2020, from the International Searching Authority in International Application No. PCT/US2020/016014.

Written Opinion dated Apr. 24, 2020, from the International Searching Authority in International Application No. PCT/US2020/016014.

* cited by examiner

UNSUPERVISED AUTOMATIC SPEECH RECOGNITION

BACKGROUND

Automatic speech recognition (ASR) includes a wide range of applications in smart phones, smart speakers, tablet computers, and/or the like. Recently, the performance of ASR has improved and the recognition accuracy in particular scenarios rivals that of a human.

SUMMARY

According to some possible implementations, a method for generating an automatic speech recognition (ASR) model using unsupervised learning comprises: obtaining, by a device, text information; determining, by the device, a set of phoneme sequences associated with the text information; obtaining, by the device, speech waveform data; determining, by the device, a set of phoneme boundaries associated with the speech waveform data; and generating, by the device, the ASR model using an output distribution matching (ODM) technique based on determining the set of phoneme sequences associated with the text information and based on determining the set of phoneme boundaries associated with the speech waveform data.

According to some possible implementations, a device comprises at least one memory configured to store program code; and at least one processor configured to read the program code and operate as instructed by the program code, the program code including: first obtaining code to obtain text information; first determining code to determine a set of phoneme sequences associated with the text information; second obtaining code to obtain speech waveform data; second determining code to determine a set of phoneme boundaries associated with the speech waveform data; and generating code to generate an automatic speech recognition (ASR) model using unsupervised learning and using an output distribution matching (ODM) technique based on the first determining code determining the set of phoneme sequences associated with the text information and based on the second determining code determining the set of phoneme boundaries associated with the speech waveform data.

According to some possible implementations, a non-transitory computer-readable medium stores instructions, the instructions comprising: one or more instructions that, when executed by one or more processors of a device, cause the one or more processors to: obtain text information; determine a set of phoneme sequences associated with the text information; obtain speech waveform data; determine a set of phoneme boundaries associated with the speech waveform data; and generate an automatic speech recognition (ASR) model using unsupervised learning and using an output distribution matching (ODM) technique based on determining the set of phoneme sequences associated with the text information and based on determining the set of phoneme boundaries associated with the speech waveform data.

DETAILED DESCRIPTION

ASR systems often rely on supervised deep learning, which requires a large amount of human-labeled data to train a deep neural network model. For example, ASR systems are typically trained using speech data that corresponds to 1,000 hours, 4,000 hours, 10,000 hours, etc. of actual speech. To acquire training data, a human is required to listen to, transcribe, and annotate copious amounts of data. In this way, training data acquisition is time-intensive, error-prone, expensive, inaccurate, inefficient, and/or the like. Further, and for some low-resource languages, obtaining the requisite amount of training data is a difficult, if not impossible, task.

Some implementations herein provide techniques for generating an ASR model that maps speech waveforms into text transcriptions. The ASR model may be a function that maps an acoustic speech signal into a word sequence. In some implementations, the ASR model initially maps the speech signal into intermediate phoneme sequences (e.g., pronunciation units), and then maps the intermediate phoneme sequences into word sequences.

Some implementations herein provide techniques for ASR model generation that do not require human-labeled data (e.g., permit model generation using unsupervised learning). In this way, some implementations herein permit improved model generation, permit improved accuracy of the generated models, reduce a need for manual effort, reduce manual errors associated with supervised learning, improve efficiency of model generation, among other technical benefits.

In addition, some implementations herein provide the following technical benefits in relation to unsupervised training of ASR models. First, some implementations herein permit the identification of phoneme boundaries in a continuous speech waveform through the iterative identification and refinement of phoneme boundaries. Second, some implementations herein permit the mapping of a speech waveform into phonemes without requiring labeled data.

Figure 1A:
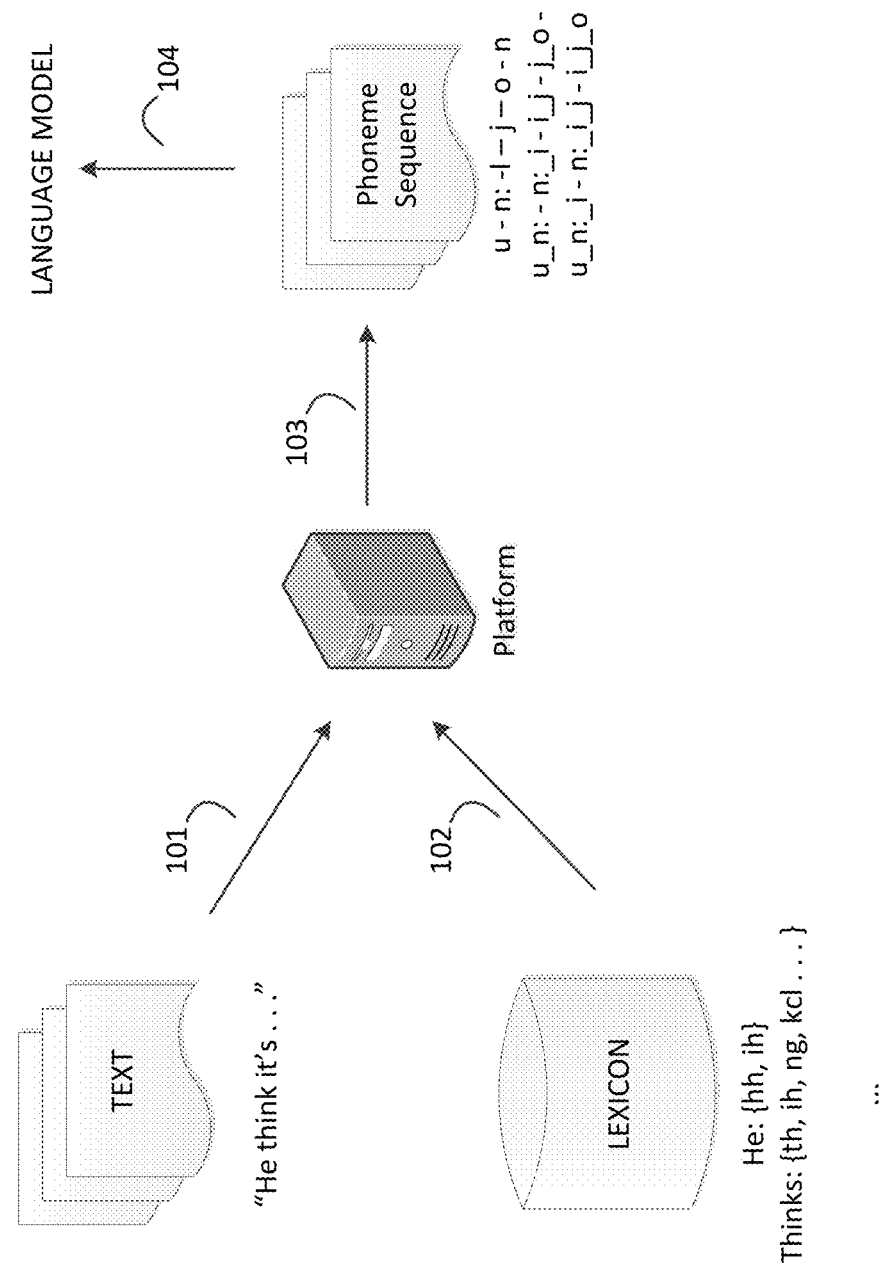
FIGS. 1A and 1B are diagrams of an overview of an example implementation described herein.
Figure 1B:
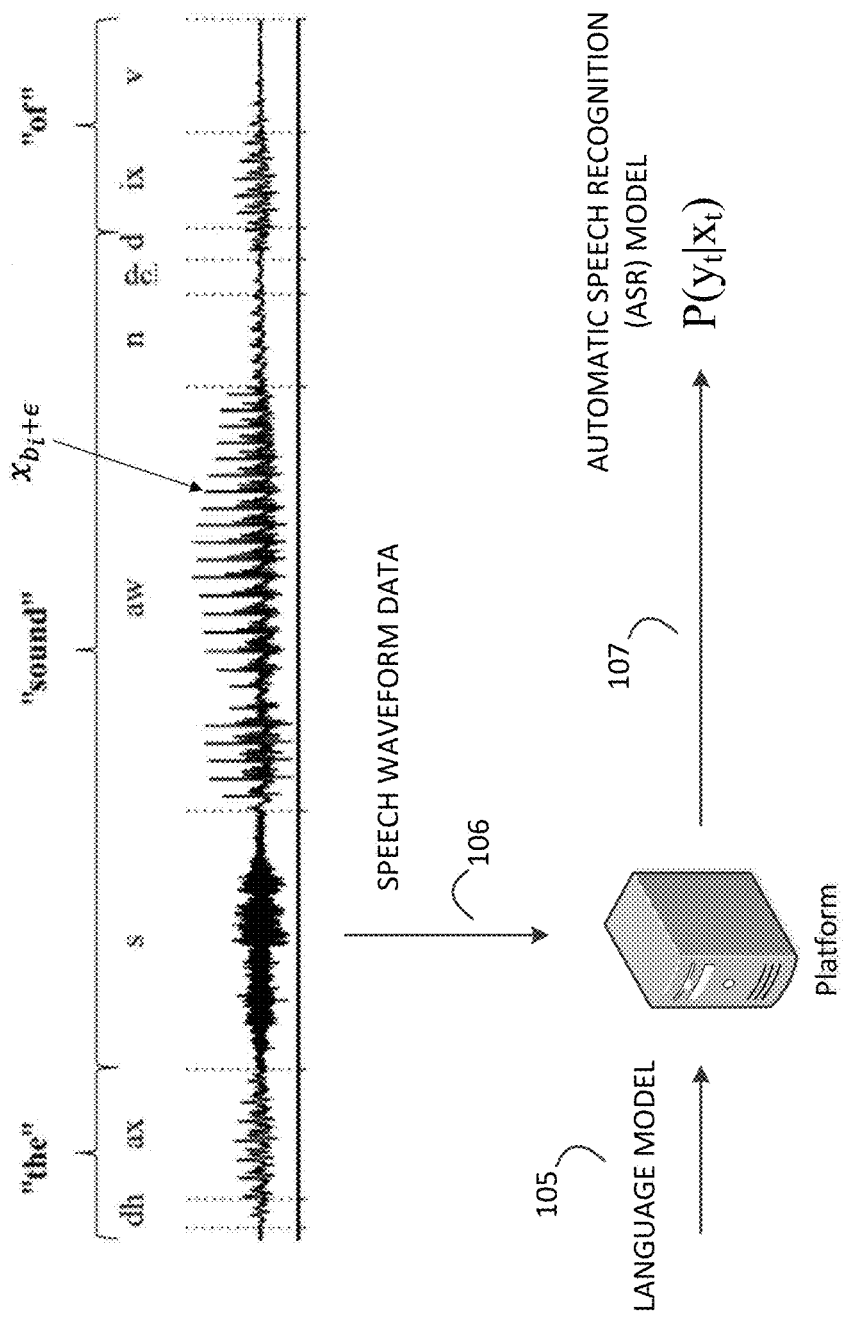

FIGS. 1A and 1B are diagrams of an overview of an embodiment described herein. As shown in FIG. 1A, and by reference number 101, a platform (e.g., a server) may obtain text information. Further, and as shown by reference number 102, the platform may obtain lexicon information. The lexicon information may include a data structure that maps word sequences and phoneme sequences. As shown by reference number 103, the platform may determine phoneme sequences associated with the text information using the lexicon information. Further still, and as shown by reference number 104, the platform may generate a language model based on determining the phoneme sequences associated with the text information. That is, the platform may train a language model using the phoneme sequences.

As shown in FIG. 1B, and by reference number 105, the platform may obtain the language model that was trained in association with FIG. 1A. Further, and as shown by reference number 106, the platform may obtain speech waveform data. Although the speech waveform data shown in FIG. 1B depicts phonemes and word sequences, in practice, the speech waveform data may be unlabeled and unannotated speech waveform data. In other words, the phonemes and word sequences are for illustrative purposes. As shown by reference number 107, the platform may generate, using unsupervised learning, an ASR model using the speech waveform data and the language model. The platform may generate the ASR model using techniques described in more detail in association with FIG. 4.

In this way, some implementations herein permit the generation of an ASR model using unsupervised learning. Put another way, some implementations herein permit ASR model generation without requiring human-labeled training data.

Figure 2:
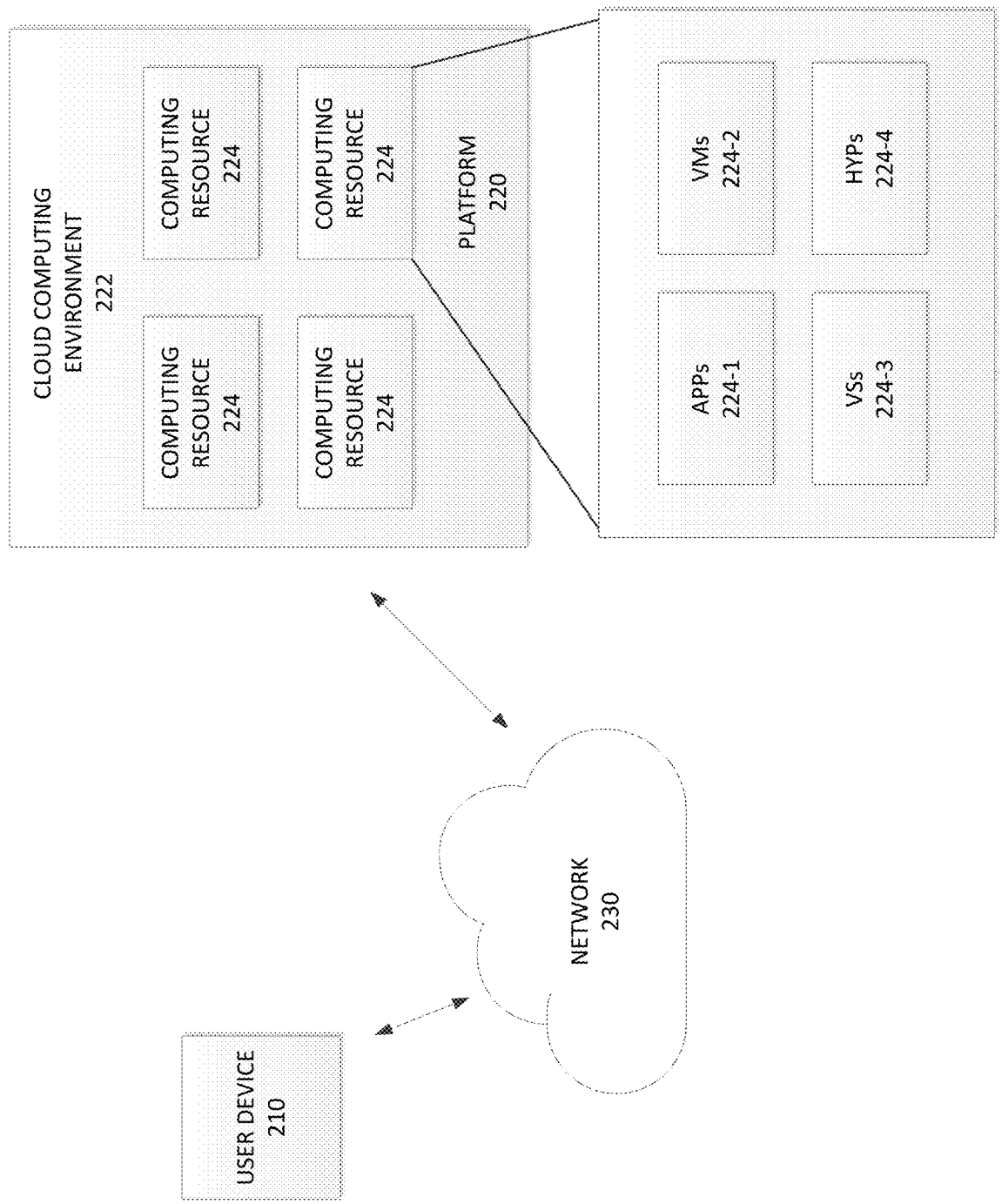
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of generating an ASR model, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
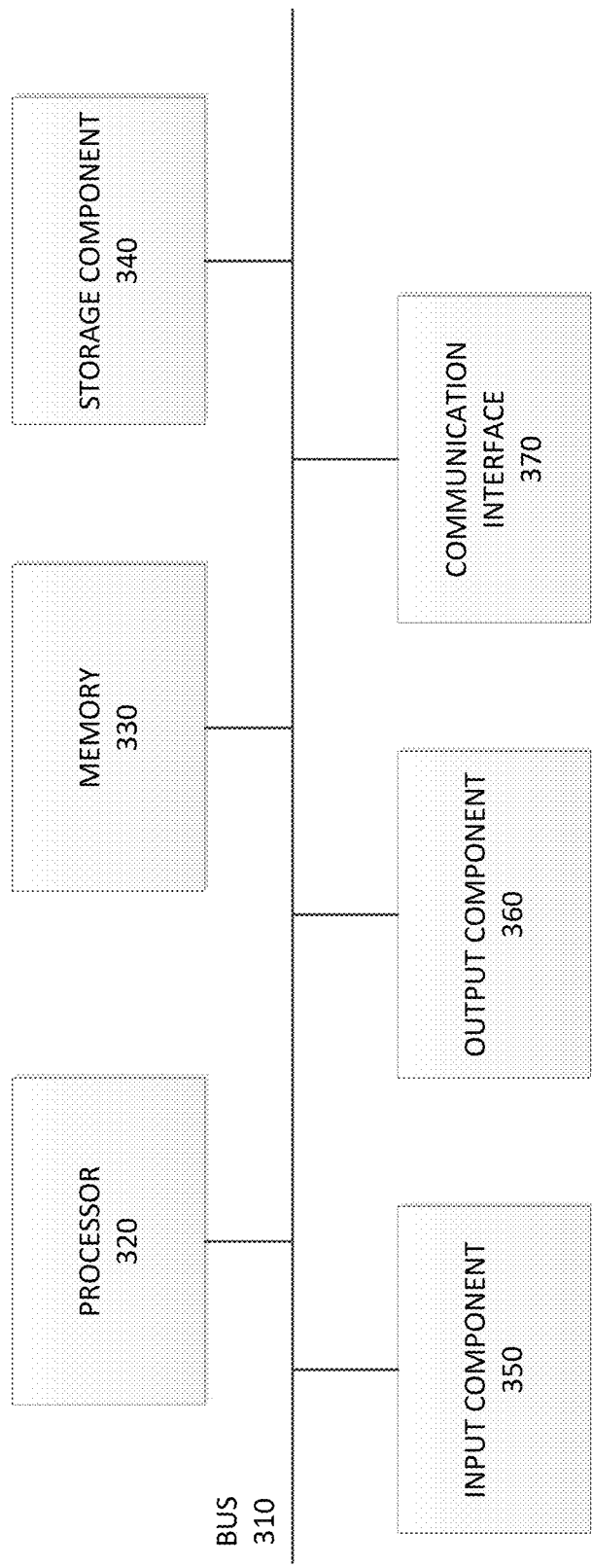
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
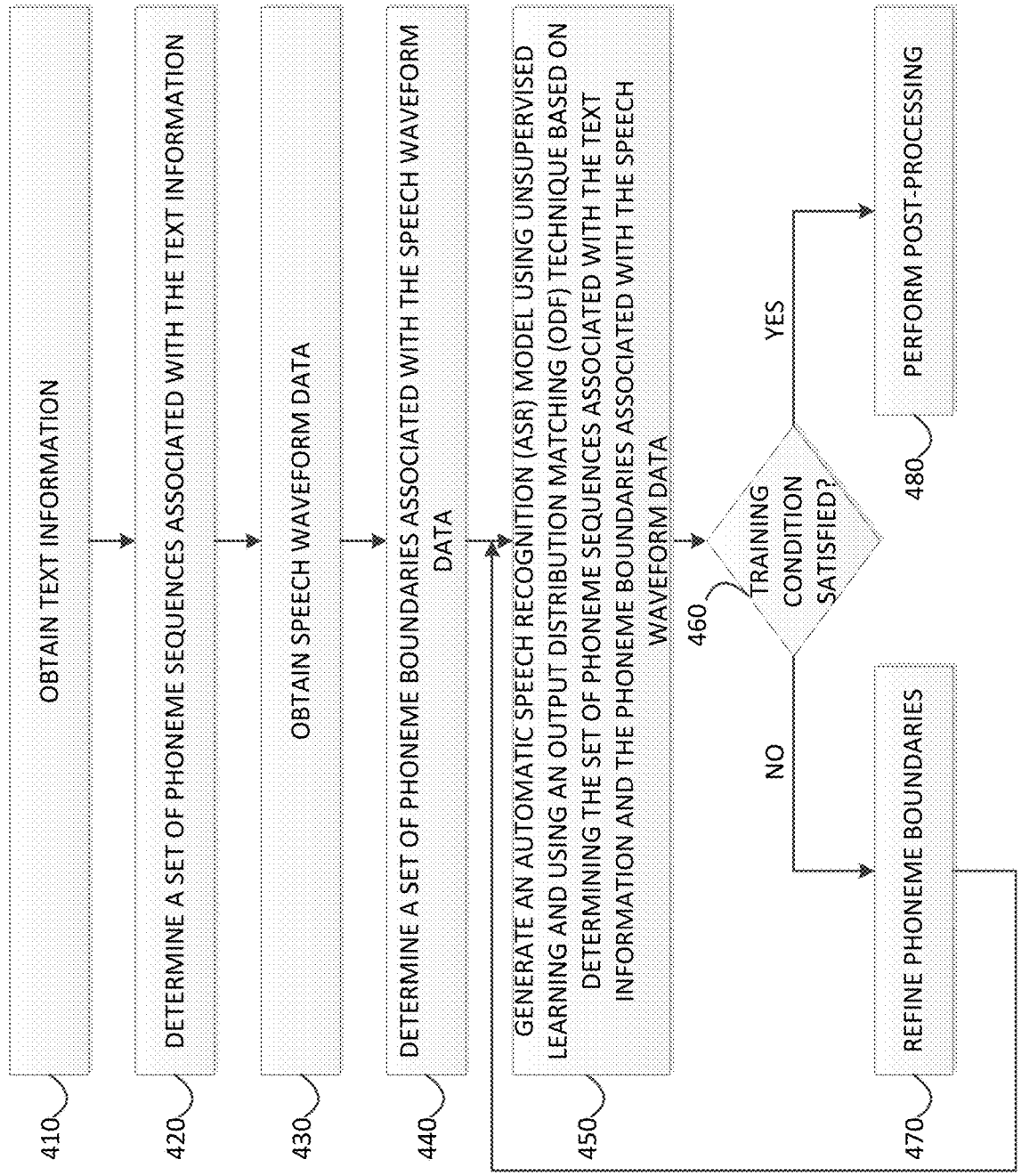
FIG. 4 is a flow chart of an example process for generating an automatic speech recognition (ASR) model using unsupervised learning and using an output distribution matching (ODM) technique.

FIG. 4 is a flow chart of an example process 400 for generating an automatic speech recognition (ASR) model using unsupervised learning and using an output distribution matching (ODM) technique. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process 400 may include obtaining text information (block 410). For example, platform 220 may receive text information from user device 210, and obtain the text information based on receiving the text information from user device 210. Additionally, or alternatively, platform 220 may implement a data extraction technique (e.g., a web mining technique, a web scraping technique, an information retrieval technique, and/or the like), and obtain the text information based on implementing the data extraction technique. Additionally, or alternatively, platform 220 may retrieve the text information from a memory location. The text information may include thousands, millions, billions, etc. of data sets. In this way, platform 220 may implement big data techniques to process the text information.

As further shown in FIG. 4, process 400 may include determining a set of phoneme sequences associated with the text information (block 420). For example, platform 220 may process the text information, and determine phoneme sequences associated with the text information. Although implementations herein are used in conjunction with phonemes, it should be understood that implementations herein are applicable to other units, such as words, sentences, n-grams, characters, and/or the like.

In some implementations, platform 220 may determine the set of phoneme sequences associated with the text information using a lexicon. For example, the lexicon may refer to a data structure that maps phonemes and word sequences.

In some implementations, platform 220 may generate a language model based on determining the set of phoneme sequences associated with the text information. In this way, and as described elsewhere herein, platform 220 may use the language model when generating the ASR model.

As further shown in FIG. 4, process 400 may include obtaining speech waveform data (block 430). For example, platform 220 may receive, from user device 210, speech waveform data. Additionally, or alternatively, platform 220 may obtain the speech waveform data in a similar manner and/or utilizing similar techniques as described above in association with the text information. The speech waveform data may constitute unlabeled data. In other words, the speech waveform data may not be have been previously-processed by an operator.

As further shown in FIG. 4, process 400 may include determining a set of phoneme boundaries associated with the speech waveform data (block 440). For example, platform 220 may determine a set of phoneme boundaries that demarcate respective phonemes associated with the speech waveform data.

In some implementations, and as described elsewhere herein, platform 220 may iteratively determine phoneme boundaries associated with the speech waveform data. For example, platform 220 may determine an initial set of phoneme boundaries associated with the speech waveform data, and may iteratively determine updated and/or refined phoneme boundaries after determining the initial set of phoneme boundaries.

In some implementations, platform 220 may determine the phoneme boundaries associated with the speech waveform data by training a Long Short-Term Memory (LSTM) Recurrent Neural Network (RNN). Further, platform 220 may use activation signals of forget gates of the LSTM RNN to estimate the phoneme boundaries. As an alternative, platform 220 may train a Gated Recurrent Unit (GRU) RNN, and use activation signals of update gates of the GRU RNN to estimate the set of phoneme boundaries.

As further shown in FIG. 4, process 400 may include generating an automatic speech recognition (ASR) model using unsupervised learning and using an output distribution matching (ODF) technique based on determining the set of phoneme sequences associated with the text information and the set of phoneme boundaries associated with the speech waveform data (block 450). For example, platform 220 may generate, using unsupervised learning, an ASR model.

In some implementations, platform 220 may generate the ASR model based on the following objective function:

$$\min_{\theta} L_{ODM}(\theta) + \lambda L_{PS}(\theta),$$

Referring to the objective function above, "$L_{ODM}$" may represent an empirical output distribution matching (ODM) cost function. For example, the empirical-ODM cost function may be represented as:

$$\min_{\theta} L_{ODM}(\theta) = \min_{\theta} \left\{ -\sum_{z} P_{LM}(z) \ln \overline{P}_{\theta}(z) \right\}$$

The empirical-ODM cost function compares the frequencies of n consecutive letters (e.g., n-grams, where n=1, 2, 3, 6, etc.). For example, the empirical-ODM cost function compares the frequency of a tri-gram (e.g., n=3), such as "qui," "uic," "ick," etc.

Referring to the empirical-ODM cost function, "Z" may represent a certain n-gram, "$P_{LM}(z)$" may represent the probability of a particular n-gram "Z" (e.g., the probability of the tri-gram "qui"), and "LM" may represent a language model (e.g., as described above in connection with block 420).

An empirical prediction probability equation may be represented as shown below:

$$\overline{P}_{\theta}(z) = \sum_{i=1}^{N} \frac{1}{N} P_{\theta}(z \mid x_{b_i + \epsilon_i}, \ldots, x_{b_j + \epsilon_j})$$

For example, the empirical prediction probability function shown above may represent an empirical prediction probability for an n-gram "Z," "$x_{bi+\epsilon i}$" may represent a randomly sampled frame in the i-th phoneme segment, "$b_i$" may represent a starting boundary of the i-th phoneme segment, "$\epsilon_i$" may represent a random variable that indexes the frames inside the i-th segment, and "j" may represent I+n−1 for the n-grams.

In some implementations, the speech data waveforms may be represented as a sequence of segments that correspond to different phonemes. As such, the inputs "$x_{bi+\epsilon i} \ldots x_{bj+\epsilon j}$" are sampled from the i-th to j-th segments.

In some implementations, the outputs corresponding to frames in the same segments should be the same. That is, for the i-th phoneme segment, the predicted output phonemes for "$x_{bi+\epsilon i}$" should be the same for any random "$\epsilon_i$." In this way, the following additional term, represented as a phoneme smoothing cost function, may be added to the empirical-ODM cost function:

$$L_{PS} = \sum_{i=0}^{T} \| P_{\theta}(y_i \mid x_i) - P_{\theta}(y_{i+1} \mid x_{i+1}) \|_2^2$$

Referring to the phoneme smoothing cost function shown above, "PS" may represent "phoneme smoothing." The phoneme smoothing cost function may operate such as to penalize a difference between the predicted outputs between different frames.

In this way, and referring to the objective function shown above, the objective function may be represented as a combination of the empirical-ODM cost function "$L_{ODM}$" and the phoneme smoothing cost function "$L_{PS}$." "$\lambda$" may represent a regularization parameter that controls a tradeoff between the empirical-ODM cost function and the phoneme smoothing function.

After the initial phoneme boundaries are determined, platform 220 may initiate optimization of the objective function shown above to train the ASR model. For example, platform 220 may initialize the phoneme boundaries, and may initialize model parameters ("θ") in $P_{\theta}$ (e.g., weights of the deep neural network).

As further shown in FIG. 4, process 400 may include determining whether a training condition is satisfied (block 460). For example, platform 220 may determine whether a training condition is satisfied based on training the ASR model.

In some implementations, the training condition may refer to a convergence or stopping criterion. As examples, the training condition may refer to a number of iterations satisfying a threshold, a number of phoneme boundary refinements satisfying a threshold, an optimization parameter satisfying a threshold, a time frame satisfying a threshold, an accuracy satisfying a threshold, and/or the like.

As further shown in FIG. 4, if the training condition is not satisfied (block 460—NO), then process 400 may include refining the phoneme boundaries (block 470). For example, platform 220 may refine the phoneme boundaries after initializing the phoneme boundaries as described above in connection with block 440.

After the initial phoneme boundaries are determined, platform 220 may train the ASR model as described above. Platform 220 may determine an updated $P_\theta(y_t|x_t)$ based on training the ASR model. Based on determining the updated $P_\theta(y_t|x_t)$, platform 220 may further refine the estimates of the phoneme boundaries using the following approach. First, platform 220 may utilize the following equation to determine a most likely phoneme sequence Y given an input X:

$$\operatorname*{argmax}_y P(Y_{1:n} \mid X_{1:n}) = \operatorname*{argmax}_y P(Y_{1:n}, X_{1:n})$$

$$= \operatorname*{argmax}_y \prod_{t=1}^n P(Y_t = y_t \mid Y_{1:t-1} = y_{1:t-1}) P(x_t \mid Y_t = y_t)$$

$$= \operatorname*{argmax}_y \prod_{t=1}^n P(Y_t = y_t \mid Y_{1:t-1} = y_{1:t-1}) \frac{P_\theta(Y_t = y_t \mid x_t) P(x_t)}{P(Y_t = y_t)}$$

$$= \operatorname*{argmax}_y \prod_{t=1}^n P(Y_t = y_t \mid Y_{1:t-1} = y_{1:t-1}) \frac{P_\theta(Y_t = y_t \mid x_t)}{P(Y_t = y_t)}$$

Further, the following condition may apply to the above equation:

$$P(Y_t = y_t \mid Y_{1:t-1} = y_{1:t-1}) = \mathbb{1}_{y_t = y_{t-1}} P(b_i \neq t) + \mathbb{1}_{y_t = y_{t-1}} (1 - P(b_i \neq t)) P_{LM}(Y_{b_i} \mid Y_{b_1}, \ldots, Y_{b_{i-1}})$$

Referring to the above, $P(b_i \neq t)$ may represent the probability that time t does not correspond to a boundary (e.g., no phoneme switch). Using the above two equations, platform 220 may perform a standard beam search method to determine an approximate sequence of $Y_{1:n}$.

Further, platform 220 may determine a refined boundary by determining a time step t where $Y_t \neq Y_{t-1}$. Platform 220 may determine the set of refined boundaries, and utilize the refined boundaries in association with the objective function as described above. In this way, platform 220 may iteratively determine refined phoneme boundaries, and implement the refined phoneme boundaries in association with the objective function. Platform 220 may iteratively perform the above operations until a training condition is satisfied.

As further shown in FIG. 4, if the training condition is satisfied (block 460—YES), then process 400 may include performing post-processing (block 480). For example, platform 220 may determine that the training condition is satisfied (e.g., using one or more of the metrics described above), and may perform post-processing of the ASR model.

In some implementations, platform 220 may apply a set of speech post-processing techniques to improve model performance. For example, platform 220 may apply training inputs to the trained model $P_\theta$ to obtain predicted outputs (e.g., predicted labels). Further, platform 220 may use the predicted outputs in conjunction with the training inputs to train a Hidden Markov Model (HMM)—Gaussian Mixture Model (GMM). Additionally, or alternatively, platform 220 may implement any number of other post-processing techniques, such as speaker adaptation, to further improve the performance of the ASR model.

In this way, some implementations herein permit fully unsupervised training of ASR models. That is, the segmentation (e.g., boundary estimation) and neural network training do not require labeled data. For example, some implementations herein permit model generation without supervised boundary information.

In contrast to supervised learning, some implementations herein improve model accuracy, reduce manual effort required for model generation, permit ASR models to be developed for a multitude of languages, reduce human error, reduce a time frame associated with model generation, among other technical benefits.

Although implementations herein describe phoneme sequences, it should be understood that other implementations include word sequences, character sequences, and/or the like, as intermediate sequences. In other words, other implementations include the direct mapping between a speech waveform and word and/or character sequences.

Also, in some implementations, Mel-frequency cepstral coefficients (MFCCs) are used as inputs. It should be understood that other implementations include other features, such as Filter Bank inputs, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating an automatic speech recognition (ASR) model using unsupervised learning, the method comprising:
   obtaining, by a device, text information;
   determining, by the device, a set of phoneme sequences associated with the text information;
   obtaining, by the device, speech waveform data;
   determining, by the device, a set of phoneme boundaries associated with the speech waveform data using activation signals of forget gates of a long short-term memory (LSTM) recurrent neural network (RNN);
   generating, by the device, the ASR model using an objective function based on determining the set of phoneme sequences associated with the text information and based on determining the set of phoneme boundaries associated with the speech waveform data;
   determining, by the device, that a number of phoneme boundary refinements satisfies a threshold based on generating the ASR model; and
   performing, by the device, post-processing of the ASR model based on determining that the number of phoneme boundary refinements satisfies the threshold,
   wherein the objective function includes an empirical output distribution matching (ODM) cost function, a phoneme smoothing function, and a regularization parameter that controls a tradeoff between the empirical-ODM cost function and the phoneme smoothing function.

2. The method of claim 1, further comprising:
   determining, by the device, another set of phoneme boundaries associated with the speech waveform data based on generating the ASR model; and
   determining that the number of phoneme boundary refinements satisfies the threshold based on determining the another set of phoneme boundaries.

3. The method of claim 1, further comprising:
   identifying, by the device, a set of word sequences associated with the text information; and
   wherein determining, by the device, the set of phoneme sequences associated with the text information comprises determining, by the device, the set of phoneme sequences based on the set of word sequences.

4. The method of claim 1, further comprising:
   comparing, by the device, a set of n-gram frequency values associated with the text information and a set of phoneme frequency values associated with the speech waveform data; and
   wherein generating, by the device, the ASR model using the objective function comprises generating, by the device, the ASR model using the objective function in association with the set of n-gram frequency values and the set of phoneme frequency values.

5. The method of claim 1, wherein the speech waveform data is unlabeled.

6. The method of claim 1, further comprising:
   performing, by the device, a beam search technique based on generating the ASR model; and
   generating, by the device, a set of refined phoneme boundaries based on performing the beam search technique.

7. The method of claim 1, further comprising:
   training a language model using the text information; and
   wherein generating, by the device, the ASR model comprises generating, by the device, the ASR model using the language model.

8. A device, comprising:
   at least one memory configured to store program code;
   at least one processor configured to read the program code and operate as instructed by the program code, the program code including:
     first obtaining code configured to cause the at least one processor to obtain text information;
     first determining code configured to cause the at least one processor to determine a set of phoneme sequences associated with the text information;
     second obtaining code configured to cause the at least one processor to obtain speech waveform data;
     second determining code configured to cause the at least one processor to determine a set of phoneme boundaries associated with the speech waveform using activation signals of forget gates of a long short-term memory (LSTM) recurrent neural network (RNN);
     generating code configured to cause the at least one processor to generate an automatic speech recognition (ASR) model using unsupervised learning and using an objective function based on the first determining code determining the set of phoneme sequences associated with the text information and based on the second determining code determining the set of phoneme boundaries associated with the speech waveform data;
     third determining code configured to cause the at least one processor to determine that a number of phoneme boundary refinements satisfies a threshold; and
     performing code configured to cause the at least one processor to perform post-processing of the ASR model based on determining that the number of phoneme boundary refinements satisfies the threshold,
     wherein the objective function includes an empirical output distribution matching (ODM) cost function, a phoneme smoothing function, and a regularization parameter that controls a tradeoff between the empirical-ODM cost function and the phoneme smoothing function.

9. The device of claim 8, further comprising:
   fourth determining code configured to cause the at least one processor to determine another set of phoneme boundaries associated with the speech waveform data based on generating the ASR model; and wherein the third determining code is configured to cause the at least one processor to determine that the number of phoneme boundary refinements satisfies the threshold based on determining the another set of phoneme boundaries.

10. The device of claim 8, further comprising:

identifying code configured to cause the at least one processor to identify a set of word sequences associated with the text information.

11. The device of claim 8, further comprising:

comparing code configured to cause the at least one processor to compare a set of n-gram frequency values associated with the text information and a set of phoneme frequency values associated with the speech waveform data.

12. The device of claim 8, wherein the speech waveform data is unlabeled.

13. The device of claim 8, further comprising:

performing code configured to cause the at least one processor to perform a beam search technique based on generating the ASR model.

14. A non-transitory computer-readable medium storing instructions, the instructions comprising: one or more instructions that, when executed by one or more processors of a device, cause the one or more processors to:

obtain text information;

determine a set of phoneme sequences associated with the text information;

obtain speech waveform data;

determine a set of phoneme boundaries associated with the speech waveform data using activation signals of forget gates of a long short-term memory (LSTM) recurrent neural network (RNN);

generate an automatic speech recognition (ASR) model using unsupervised learning and using an objective function based on determining the set of phoneme sequences associated with the text information and based on determining the set of phoneme boundaries associated with the speech waveform data;

determine that a number of phoneme boundary refinements satisfies a threshold; and perform post-processing of the ASR model based on determining that the number of phoneme boundary refinements satisfies the threshold, wherein the objective function includes an empirical output distribution matching (ODM) cost function, a phoneme smoothing function, and a regularization parameter that controls a tradeoff between the empirical-ODM cost function and the phoneme smoothing function.

\* \* \* \* \*